(No Model.)
C. P. HARRIS & S. BALTZLY.
COUPLING HOOK AND LOOP.
No. 310,274. Fig. 1. Patented Jan. 6, 1885.
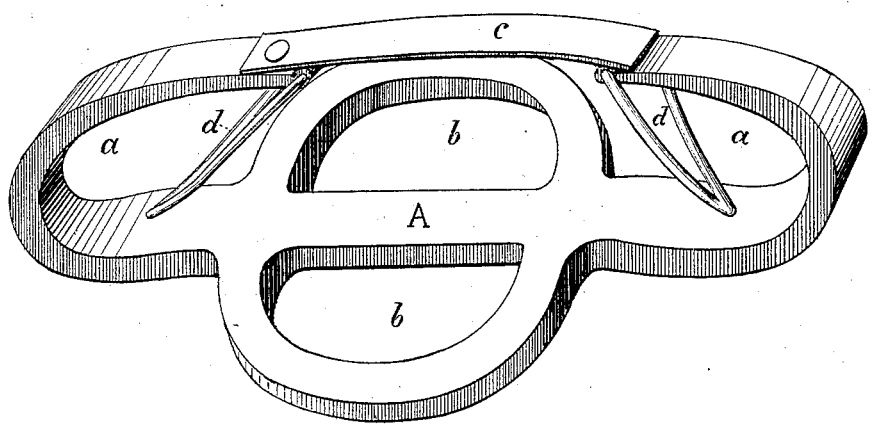
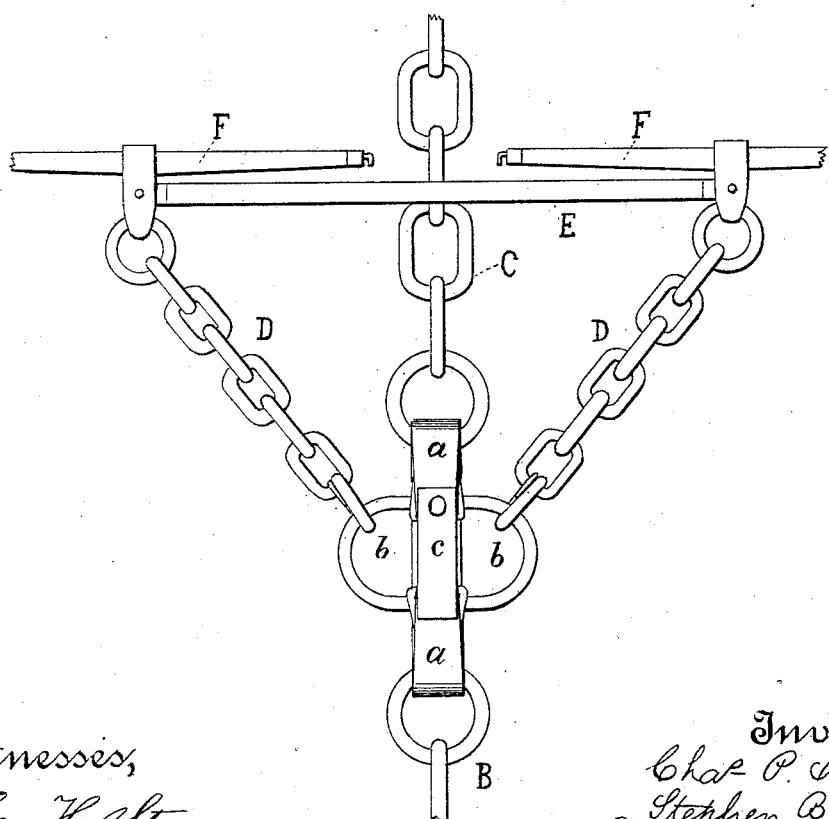
Witnesses,
Geo. H. Strong.
J. H. Rouse
Inventors,
Chas. P. Harris
Stephen Baltzly
By Dewey & Co.
Attorneys

UNITED STATES PATENT OFFICE.

CHARLES P. HARRIS AND STEPHEN BALTZLY, OF HILL'S FERRY, CAL.

COUPLING HOOK AND LOOP.

SPECIFICATION forming part of Letters Patent No. 310,274, dated January 6, 1885.

Application filed April 8, 1884. (No model.)

*To all whom it may concern:*

Be it known that we, CHARLES P. HARRIS and STEPHEN BALTZLY, of Hill's Ferry, county of Stanislaus, and State of California, have invented an Improvement in a Combined Double Coupling Hook and Loop; and we hereby declare the following to be a full, clear, and exact description thereof.

Our invention relates to the class of coupling hooks and loops; and it consists in a bar having a hook at each end and a loop at each side. A spring-guard spans the space between the adjacent ends of the hooks to prevent any interference with them.

The object of our invention is to provide a simple and effective device for general coupling purposes, but especially for use in coupling together the fifth-chains and stretcher-chains by which teams of mules or horses are hitched together for heavy hauling.

Referring to the accompanying drawings, Figure 1 is a perspective view of our combined double coupling hook and loop. Fig. 2 is a view showing its application to the fifth and stretcher chains, whereby they are coupled.

A is a bar having its ends turned upward in the same direction, and backward, forming the hooks *a a*, one at each end. The body of the bar at its center is widened, and has formed in it the loops *b b*, one on each side of a central rib. Riveted to the top of one hook is a strong spring-strip, *c*, the free end of which laps over the top of the other hook, thus spanning the space between the hooks. The links *d*, pivoted in the ends of the hooks, are the usual form of drop or guard links.

In Fig. 2, B is one fifth-chain, C is another, and D D are the stretcher-chains, diverging and secured at their forward ends to the stretcher-bar E, to which the single-trees F are suitably secured. The fifth-chain B has its terminal link fitted in the rear hook *a*. The fifth-chain C has its terminal link fitted in the forward hook *a*, and the rear ends of the stretcher-chains D D are secured to the side loops, *b b*. This fastening of the stretcher-chains may be effected by means of an ordinary hook on the chains, or by a split link, or in any other suitable manner. The terminal links of the fifth-chains are fitted to their hooks by inserting them under the free end of the spring-guard *c* and then slipping each to its respective hook, where it is guarded by the drop-links *d*. The object of the spring-guard *c* is to prevent the hooks from interfering with the chains or ropes or lines about the hitching apparatus by catching in them.

The chains are readily coupled together by this device, and it can be made strong enough for efficient service and cheap enough for general use.

Having thus described our invention, what we claim as new, and desire to secure by Letters Patent, is—

1. The oppositely-located end hooks, *a a*, each provided with drop-links *d*, and the central side loops, *b b*, one on each side of a central rib, substantially as herein described.

2. The bar A, having an upward-turned hook, *a*, at each end, and the loops *b b*, one on each side of the bar A, in combination with a spring-guard strip, *c*, and the drop-links pivotally secured in the ends of the hooks *a*, substantially as herein set forth.

In witness whereof we have hereunto set our hands.

CHAS. P. HARRIS.
STEPHEN BALTZLY.

Witnesses:
J. MCNISH,
JOHN DE HART.